(12) United States Patent
Cathey

(10) Patent No.: US 7,129,930 B1
(45) Date of Patent: Oct. 31, 2006

(54) CORDLESS COMPUTER KEYBOARD WITH ILLUMINATED KEYS

(75) Inventor: David A. Cathey, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/544,000

(22) Filed: Apr. 6, 2000

(51) Int. Cl.
   *G09G 5/00* (2006.01)
(52) U.S. Cl. .................. 345/168; 345/169; 341/22; 400/495
(58) Field of Classification Search ............... 345/168, 345/169, 170, 158; 341/23, 20, 21–22; 250/486.1, 250/462.1, 486.2; 200/317, 314; 400/490, 400/495–496, 472–473; 362/23–24, 26, 362/30, 84, 253, 85
See application file for complete search history.

(56) References Cited

U.S. PATENT DOCUMENTS

| | | | | |
|---|---|---|---|---|
| 4,205,522 | A * | 6/1980 | Takami | 349/71 |
| 4,451,714 | A * | 5/1984 | Eventoff | 200/5 A |
| 4,551,717 | A * | 11/1985 | Dreher | 345/170 |
| 4,882,581 | A * | 11/1989 | Inobe et al. | 341/22 |
| 5,925,110 | A | 7/1999 | Klein | 341/22 |
| 5,936,554 | A * | 8/1999 | Stanek | 341/22 |
| 6,211,862 | B1 * | 4/2001 | Park et al. | 345/169 |
| 6,215,420 | B1 * | 4/2001 | Harrison et al. | 341/22 |
| 6,217,183 | B1 * | 4/2001 | Shipman | 200/314 |
| 6,340,588 | B1 * | 1/2002 | Nova et al. | 435/287.1 |
| 6,507,763 | B1 * | 1/2003 | Schneider et al. | 700/84 |

* cited by examiner

Primary Examiner—Richard Hjerpe
Assistant Examiner—Abbas Abdulselam
(74) Attorney, Agent, or Firm—TraskBritt

(57) ABSTRACT

A remote keyboard has keys which are illuminated for identification under a dim motherboard. For a first embodiment of the invention, the identifying symbol or symbols on each key cap of the keyboard is formed from luminescent material. Alternatively, the symbol or symbols on each key cap are formed from a translucent material in which tritium is embedded. Tritium, which has a half-life of about 12.5 years, emits low-energy beta particle radiation. The radiation, which is of sufficiently low energy that it may be blocked by a piece of paper, may be rendered innocuous by placing clear plastic radiation shields over each key cap. For a second embodiment of the invention, the key caps themselves are molded from luminescent material, while the symbols are formed from contrasting black or dark-colored non-luminescent material. A third embodiment of the invention utilizes fiber optics to convey light from at least one low-power source, such as a light-emitting diode, to each of the various key caps, each of which is molded from a translucent material. The symbols on the key caps are of a color which contrasts with that of the key caps. Black letters on light colored translucent key caps are the preferred combination. Another embodiment of the present invention for backlighting a keyboard is to use a transparent projector pane positioned beneath translucent or transparent key caps on which identifying symbols are printed. Light from a light source at the edge of the projector pane is transmitted throughout the pane. An aperture beneath each key top projects light up through the key caps, illuminating the symbols.

2 Claims, 2 Drawing Sheets

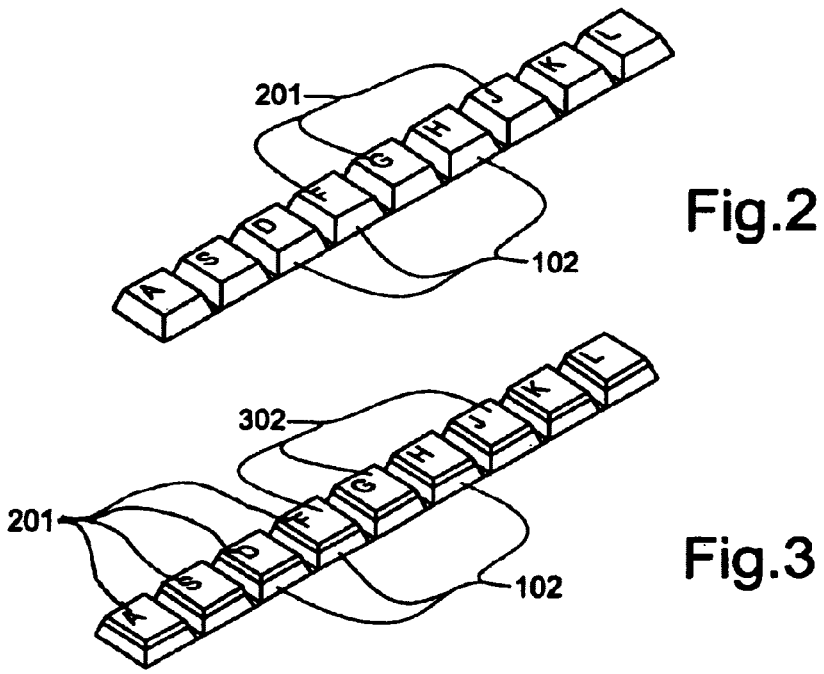
Fig.2
Fig.3
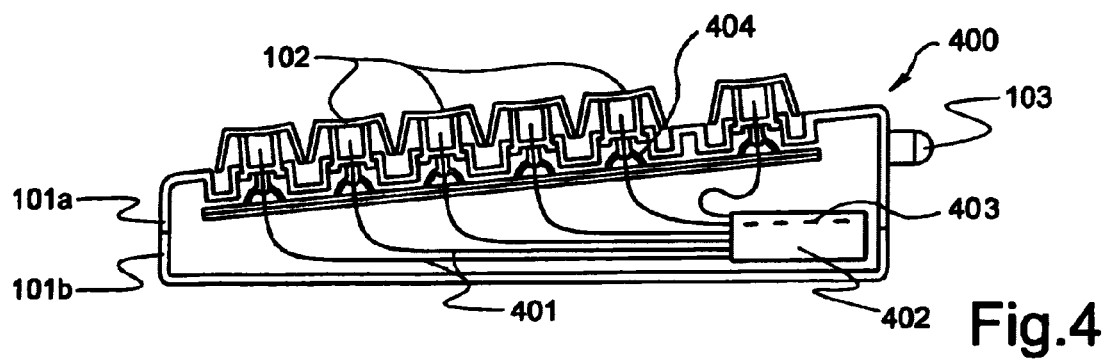
Fig.4
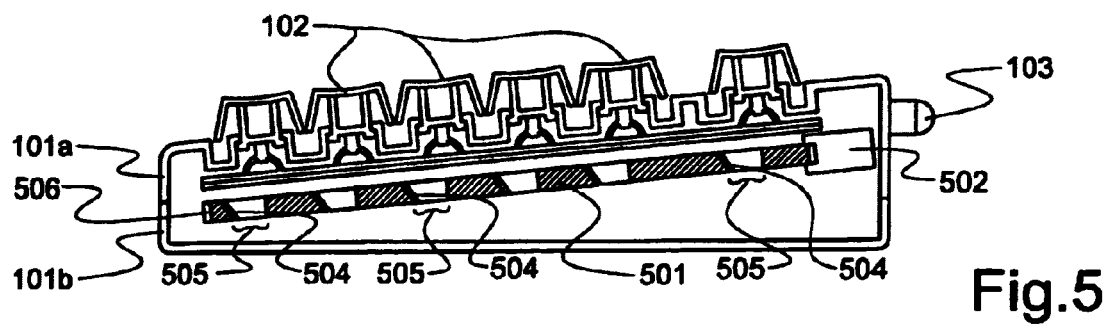
Fig.5

CORDLESS COMPUTER KEYBOARD WITH ILLUMINATED KEYS

BACKGROUND OF THE INVENTION

1. Field of the Invention

This invention relates to computer keyboards. More specifically, the present invention relates to remote computer keyboards using either luminescent keys or a lighted keyboard for improved viewing in a dark room.

2. State of the Art

The computer industry has been using remote keyboards for a number of years. Such keyboards typically employ a transmitter, operating within a narrow band of the electromagnetic spectrum, which communicates with a receiver directly coupled to the central processing unit. Signals received from the keyboard are translated into standard keyboard signals understood by the central processing unit. The reason for using a remote keyboard is to remove the necessity of a connection cord between the keyboard and the computer console. A remote keyboard permits the user to submit typed data to the central processing unit anywhere within the range of the transmitter receiver combination. Although infrared band frequencies are generally used from communications between remote computers and central processing units, other frequency bands may also be used successfully. When infrared energy is used for communications between a central processing unit and a remote keyboard, the keyboard must generally remain in the same room and be in a direct line of sight with the infrared receiver. As illustrated in drawing FIG. 1, a typical conventional QWERTY-configured remote keyboard 100 is shown. The keyboard 100 is contained within an enclosure 101 having an portion 101b and a bottom portion 101b. A plurality of key caps 102, which includes keys for space, shift, control and, backspace functions, is surrounded by the upper enclosures 101a. The keyboard 100 also has an infrared transmitter 103 which is coupled to the key caps 102 via an encoder device (not shown). The keyboard 100 is interfaced to a central processing unit 105 via a receiver 104 and decoder device (not shown).

It is readily acknowledged that remote keyboards are generally difficult to use in dark rooms because it is difficult for a computer operator to identify individual keys in the dark. Although most computer users consider themselves typists, such users will typically look at the keyboard when little used keys or key combinations must be pressed. The lack of complete standardization of keyboards exacerbates this problem. Certain multikey combinations, such as Ctrl, Alt, Del, used for a warm boot operation require the operator to remove his hands from the normal typing position. Once the hands are removed, it may be somewhat difficult to return to the normal position and resume touch typing. Thus, it may be concluded that at least the average typist is at a disadvantage in a dark room because he cannot identify individual keys of the keyboard. Although cathode ray tube computer monitors generate sufficient light to illuminate the keyboard at close distances, as the operator distances himself from the monitor, the intensity of illumination drops rapidly.

Computer operators having a remote keyboard have the same problem as an individual attempting to make a telephone call on a telephone with an unlighted keypad. Fortunately, most telephone manufacturers now provide backlighting for telephone keypads so that the numbers are identifiable in the dark. The same may be said for an individual attempting to utilize a television control device in a dimly lit room. Remote control manufacturers for various electronic devices have responded to this problem by providing control keys with identifying markings which fluoresce or luminesce.

Another example of a lighted viewing area is a backlit computer LCD screen which is used, in portable PC computers. Portable LCD computer screens without backlighting are difficult to view under normal lighting conditions, and nearly impossible to view in a dark room. Portable computer manufacturers use backlit computer LCD screens to allow users to see the LCD screens in dark and low light conditions.

SUMMARY OF THE INVENTION

The present invention overcomes the problem of computer users not being able to identify the keys of their cordless keyboard in a darkened room by lighting the keys. The present invention illustrates various alternatives to light the keys of a remote computer keyboard coupled via a remote transmitter to the computer console or microprocessor motherboard.

For a first embodiment of the invention, the identifying attribute, symbol, or symbols on each key top of the keyboard, whether it be a character symbol (e.g., one of the 94 standard printable characters) or a word or abbreviated word which represents one of the control characters (e.g., Esc, Tab, Caps Lock, Shift, Ctrl, Alt, Backspace, Enter, etc.) is formed from luminescent material. When the luminescent material is exposed to bright light in the visible or ultraviolet spectrum, electrons within the material are excited to orbitals of higher energy. When the light exposure is terminated, the electrons gradually decay to lower-energy orbitals, thereby releasing light in the visible spectrum. The luminescent symbols allow the user to view the letters on the computer keys in the dark room. After the luminescent effect has diminished to the point where the symbols are no longer discernable, they may be recharged by further exposure to light. Alternatively, the key attributes (i.e., character symbols, words and abbreviations) on the key caps may be formed from a translucent plastic material in which tritium is embedded. Tritium, which has a half-life of about 12.5 years, emits low-energy beta particle radiation. The radiation is of sufficiently low energy that it may be easily blocked by the material in which the tritium is embedded.

For a second embodiment of the invention that is very similar to the first, the key caps themselves are molded from luminescent material, while the symbols are formed from contrasting black or dark-colored non-luminescent material.

A third embodiment of the invention utilizes fiber optics to convey light from at least one low-power source, such as a light-emitting diode, to each of the various key caps, each of which is molded from a translucent material. The symbols on the key caps are of a color which contrasts with that of the key caps. Black letters on light colored translucent key caps are the preferred combination. For this embodiment, a single light source contained within the keyboard enclosure is connected to a plurality of optical fiber strands, preferably made of transparent plastic or glass. Each of these optical fiber strands is routed so that light emitting therefrom is directed to a single key top. A single light source may be utilized for all keys, or multiple light sources may be utilized. Greater energy efficiency will be obtained by using fewer light sources than there are keys. The light source is powered by a chemical electrical power source such as a battery or multiple dry cells. The same power source may be used to power the keyboard-to-computer communication link, whether it uses infrared radiation or electromagnetic radiation in another frequency band. Alternatively, separate chemical-based energy sources may be used to power the lighting feature and the communication link. When the light source is switched on, the optical fibers transmit a portion of the light generated by the source to the various, keys effectively lighting the symbols on the key faces with background lighting.

Yet another embodiment of the present invention for backlighting a keyboard is to use a very thin transparent plastic or glass projector pane which is positioned beneath the key caps of the keyboard. At least one light source, such as an LED or an incandescent bulb, is focused on the edge of the pane. When the light source is switched on, light from the source is transmitted within the projector pane and is reflected upwardly to the key caps by angled walls of apertures within the pane. The keyboard keys are made of a semi-transparent or translucent material such as a clear or translucent plastic, glass or an equivalent type of transparent material. Because the keys are light-transmissive, the light is visible through the key caps. As the symbols are of a color which contrasts with the key cap material, the symbols are readily identifiable in dim lighting conditions.

BRIEF DESCRIPTION OF THE SEVERAL VIEWS OF THE DRAWINGS

FIG. 2 is a perspective view of key caps having identifying symbols formed from a luminescent or radioactive material;

FIG. 3 is a perspective view of key caps formed from a luminescent material and having contrasting symbols formed thereon;

FIG. 4 is a cut-away side view of a cordless computer keyboard having key caps illuminated by a battery-powered light source via optical fiber strands; and FIG. 5 is a cut-away side view of a cordless computer keyboard having key caps illuminated by a battery-powered light source via a projector pane.

DETAILED DESCRIPTION OF THE INVENTION

Figure 1:
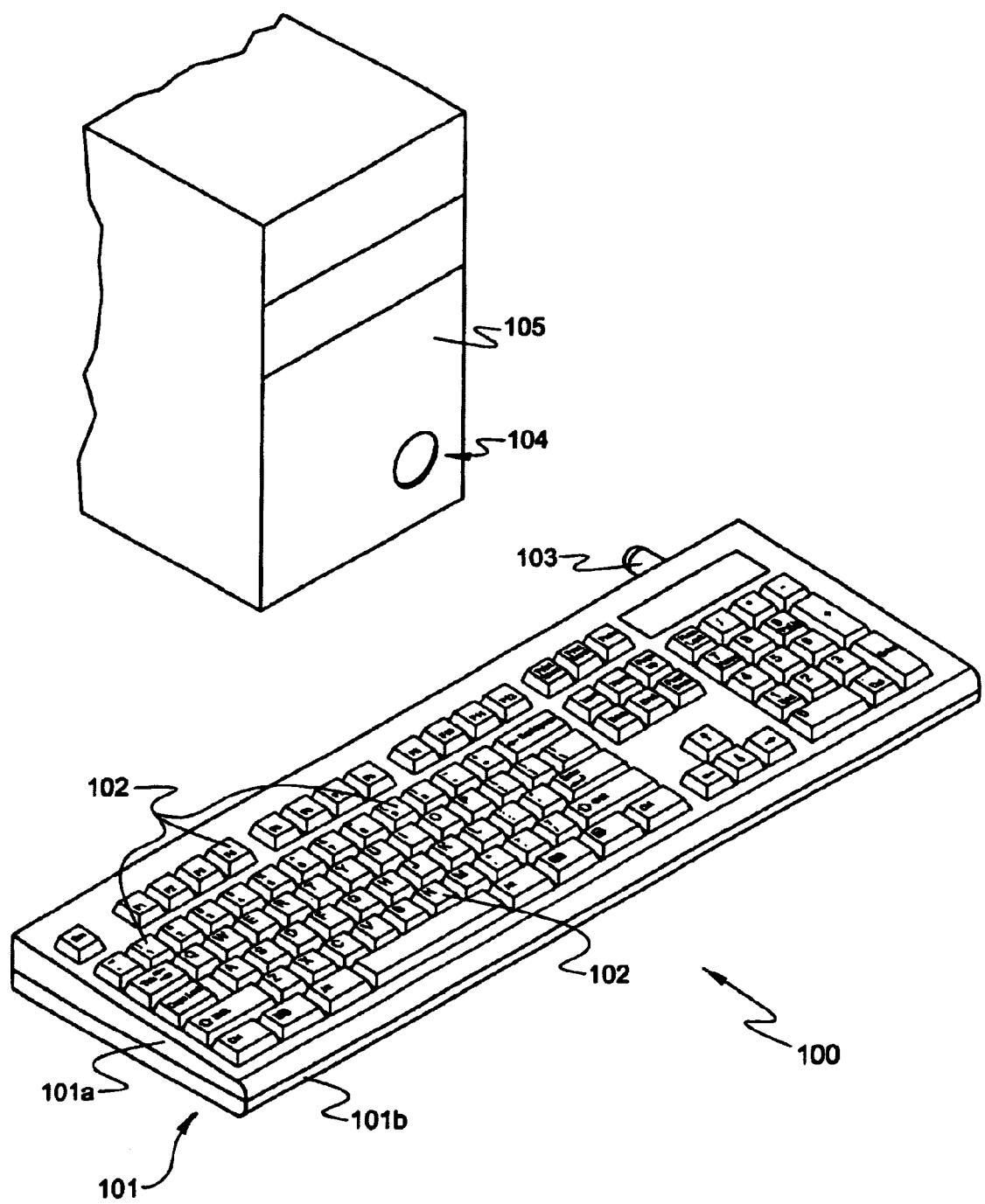
FIG. 1 is a perspective view of a conventionally configured cordless keyboard.

As it readily recognized that the symbols on non-illuminated key caps of a cordless computer may be difficult to identify under dim lighting conditions, the present invention provides various embodiments for keyboards having illuminated key caps.

Referring once again to drawing FIG. 1, the present invention may be incorporated in a conventional-appearing cordless keyboard. Under bright lighting conditions, the keyboard of the present invention may appear completely conventional by outward appearances.

Referring now to drawing FIG. 2, a first embodiment of the invention employs key caps 102 on which the identifying attribute 201, whether it be a character symbol (e.g., one of the 94 standard printable characters) or a word or abbreviated word which represents one of the control characters (e.g., Esc, Tab, Caps Lock, Shift, Ctrl, Alt, Backspace, Enter, etc.) is formed from luminescent material. Luminescent materials are well known in the art, having been used for decades on clock and watch dials. The luminescent material may be printed on the upper surface of each key cap, or it may be incorporated in the key cap during the molding process. When a luminescent material is exposed to bright light in the visible or ultraviolet spectrum, electrons within the material are excited to orbitals of higher energy. When the light exposure is terminated, the electrons gradually decay to lower-energy orbitals, thereby releasing light in the visible spectrum. The luminescent symbols allow the user to view the letters on the computer keys in the dark room. After the luminescent effect has diminished to the point where the symbols are no longer discernable, they may be recharged by further exposure to light. Alternatively, the key attributes (i.e., character symbols, words and abbreviations) 201 on the key caps may be formed from a translucent plastic material in which tritium is embedded. Tritium, which has a half-life of about 12.5 years, emits low-energy beta particle radiation. The radiation is of sufficiently low energy that it may be easily blocked by the material in which the tritium is embedded.

Depicted in drawing FIG. 3 is a second embodiment of the invention that is similar to the first. For this embodiment, at least an upper portion 302 of each key cap 102 is formed from luminescent material, while the symbols 201 are formed or printed from contrasting black or dark-colored non-luminescent material.

A third embodiment shown in drawing FIG. 4 utilizes optical fiber strands 401 to distribute a portion of the light emitted by a single light source 402 to multiple key caps 102, which are molded from translucent material. Certain aspects of the keyboard 400 are 400 are of conventional design. The keyboard enclosure 101 is comprised of a bottom portion 101b and a top portion 101a. An electromagnetic transmitter 103, which is attached to the rear of the enclosure 101, is coupled to a printed circuit board 403. A resilient switch button 404 is attached to the circuit board 403 beneath each key cap 102. When a key cap 102 is depressed, the button beneath that key cap is temporarily deformed, making a closed circuit and sending a decoded signal to the transmitter 103. Both the circuit board 403 and the switch button 404 have apertures through which the optical fiber strands 401 may pass. Each of these optical fiber strands 401 is routed so that light emitting therefrom is directed to a single key top. A single light source may be utilized for all keys, or multiple light sources may be utilized. Greater energy efficiency will be obtained by using fewer light sources than there are keys. The light source is powered by a chemical electrical power source such as a battery or multiple dry cells (not shown). The same power source may be used to power the keyboard-to-computer communication link, whether it uses infrared radiation or electromagnetic radiation in another frequency band. Alternatively, separate chemical-based energy sources may be used to power the lighting feature and the communication link. When the light source is switched on, the optical fibers transmit a portion of the light generated by the source to the various keys, effectively lighting the symbols on the key faces with background lighting.

A fourth embodiment of the invention is depicted in drawing FIG. 5. A laminar transparent plastic or glass projector pane 501 positioned beneath the key caps of the keyboard. At least one light source 502, such as an LED or an incandescent bulb, is focused on the edge of the pane 501. When the incandescent light source or LED is switched on, the light is transmitted within the projector pane and is reflected upwardly to the key caps by angled reflective walls 504 of apertures 505 within the pane 501. The keyboard key caps 102 are made of a semi-transparent or translucent material such as a clear or translucent plastic, glass or an equivalent type of transparent material. Because the keys are light-transmissive, the light is visible through the key caps.

As the symbols are of a color which contrasts with the key cap material, the symbols are readily identifiable in dim lighting conditions. In order to prevent light from escaping from the edges of the pane 501, the edges may be plated with a reflective coating 506.

Although several embodiments of the cordless computer keyboard with illuminated keys are described herein, it will be obvious to those having ordinary skill in the art that changes and modifications may be made thereto without departing from the scope and the spirit of the invention as hereinafter claimed.

What is claimed is:

1. A remote computer keyboard comprising:
an enclosure member;
a chemical source of electrical power;
a transmitter mounted on said enclosure member, said transmitter powered by said chemical source of electrical power;
an insulative material layer covered with circuit traces, said insulative material layer being positioned in said enclosure member, said circuit traces being coupled to said transmitter;
a plurality of depressible key switch devices arrayed above said insulative material layer;
a key cap mounted atop each switch device of said plurality of switch devices, each key cap having at least one identifying graphic symbol formed on a surface thereof of a first material having no electrical connection thereto including one of a black material and a dark-colored non-luminescent material; and
a second luminescent material embedded within a portion of each key cap different than the first material forming the identifying graphic symbol, the second luminescent material substantially embedded throughout each key cap.

2. A remote computer keyboard comprising:
an enclosure member;
a chemical source of electrical power;
a transmitter mounted on said enclosure member, said transmitter powered by said chemical source of electrical power;
an insulative material layer covered with circuit traces, said insulative material layer being positioned in said enclosure member, said circuit traces being coupled to said transmitter;
a plurality of depressible key switch devices arrayed above said insulative material layer;
a key cap mounted atop each switch device of said plurality of switch devices, each key cap having at least one identifying graphic symbol formed on a surface thereof of a first material having no electrical connection thereto including one of a black material and a dark-colored non-luminescent material; and
a second luminescent material including tritium embedded within said at least one symbol of each key cap different than the first material forming the identifying graphic symbol, the second luminescent material substantially embedded throughout each key cap.

* * * * *